(12) United States Patent
Troedel

(10) Patent No.: US 6,304,817 B1
(45) Date of Patent: Oct. 16, 2001

(54) AUDIO/NAVIGATION SYSTEM WITH AUTOMATIC SETTING OF USER-DEPENDENT SYSTEM PARAMETERS

(75) Inventor: Bernhard Troedel, Solms (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/514,652

(22) Filed: Feb. 29, 2000

(30) Foreign Application Priority Data

Mar. 11, 1999 (DE) .............................................. 199 10 760

(51) Int. Cl.⁷ .............................. G01L 5/00; G01C 21/00
(52) U.S. Cl. .................... 701/200; 701/201; 340/825.44; 340/996; 455/186; 379/58; 381/46; 465/449
(58) Field of Search ...................................... 701/200, 211; 340/576; 376/67; 364/449

(56) References Cited

U.S. PATENT DOCUMENTS

| 4,731,811 | * | 3/1988 | Dubus | 379/58 |
| 4,989,151 | * | 1/1991 | Nuimura | 364/449 |
| 5,040,212 | * | 8/1991 | Bethards | 381/41 |
| 5,170,164 | * | 12/1992 | Lewis | 340/988 |
| 5,694,116 | * | 12/1997 | Kojima | 340/576 |
| 5,754,430 | * | 5/1998 | Sawada | 364/449.3 |
| 5,805,672 | * | 9/1998 | Barkat et al. | 379/67 |
| 5,809,447 | * | 9/1998 | Kato et al. | 701/211 |

* cited by examiner

*Primary Examiner*—William A. Cuchlinski, Jr.
*Assistant Examiner*—Tuan C To
(74) *Attorney, Agent, or Firm*—Mayer, Brown & Platt

(57) ABSTRACT

The invention proposes an audio and/or navigation system for a motor vehicle with increased user convenience, particularly when the vehicle is used by more than one user. The audio and/or navigation system has a memory element (2) for storing user-related system parameters, and means (4) for identifying the user as well as means (5), which are connected to the memory element (2), for selecting and setting the stored user-related system parameters for the user as current system parameters.

12 Claims, 2 Drawing Sheets

AUDIO/NAVIGATION SYSTEM WITH AUTOMATIC SETTING OF USER-DEPENDENT SYSTEM PARAMETERS

BACKGROUND OF THE INVENTION

1. Field of the Invention

The invention relates to an audio and/or navigation system in a motor vehicle having a control unit for a user to set system parameters.

2. Background of the Invention

Audio systems are some of the most common information and convenience systems in motor vehicles. They have a control unit for setting various system parameters. These include, by way of example, setting the desired radio station, the volume or the tone. It is also possible, by way of example, to select automatic cut-in of traffic announcements in the course of CD or cassette operation.

Navigation systems are some of the more modern information systems in motor vehicles. When a destination has been input, the systems calculate a journey route and output the necessary instructions to the driver during the journey. For dynamic route selection, that is to say route selection taking into account changing traffic conditions, the navigation systems can be connected to an audio system. This allows traffic announcements broadcast by radio to be passed directly to the navigation system via the audio system, and to be taken into account for determining the route.

The navigation system also has a control unit. The control unit can be used to select destinations from an address book, for example. It is also possible for the information representation preferred by the driver to be selected. Thus, as an example, it is possible to show map sections or arrows indicating that it is necessary to take a turnoff, for example. An audio system and a navigation system can also exist in a joint unit with a single control unit.

If the vehicle is used by different drivers, then these drivers will also prefer different system settings for the audio and/or navigation system. This means that each user will make his personally preferred system settings before setting out on a journey. This procedure is, on the one hand, time-consuming, and, on the other hand, the system parameters have to be set while the audio or navigation system is switched on. In many cases, the settings are therefore made while the engine is running. This is not desirable for environmental reasons, however. In addition, particularly in the case of company cars, the problem arises that the navigation system's address books can be seen by all users. It is not possible to have a personal allocation of an address book to one user.

SUMMARY OF THE INVENTION

This is where the present invention now comes into play, the object of said invention being to specify an audio and/or navigation system which is easy to operate, particularly when the vehicle is used by more than one user.

The object is achieved in a generic audio and/or navigation system in a motor vehicle in that the system interacts with a memory element for storing user-related system parameters and with means for identifying the user, and contains further means, which are connected to the memory element and to the means for identifying the user, for selecting and setting the stored user-related system parameters for the user as current system parameters.

The inventive refinement of an audio and/or navigation system eliminates the need for regular, time-consuming, manual input of system parameters by the user before the journey. The result of this is a marked improvement in convenience in vehicles which are regularly used by different people. Each user of the vehicle need set his desired system parameters only once using the setting elements of the audio and/or navigation system and then store them in a memory element. The memory element can be both a component part of the audio and/or navigation system or else be arranged externally. Once the user has stored his preferred system parameters in the memory element, these parameters are then set again as soon as the means for identifying the user have identified him. The user can be identified by means of voice recognition, for example. To this end, the audio and/or navigation system must interact with a voice recognition system. The driver speaks one or a few words in order to be identified by the voice recognition system. If the user is recognized by the voice recognition system, the information about his identity is passed on to the audio and/or navigation system, so that the associated system parameters can be selected and set.

The user can also be identified by means of the vehicle key used, for example. If, as an example, the vehicle is one with a remotely controlled locking system, the vehicle key is connected to a receiver inside the vehicle via an infrared or radio connection. The receiver and the key interchange data to identify an authorized driver. Hence, it is an easy matter to be able to expand the data interchanged such that it is also possible to make a distinction between various keys of authorized drivers. In such a case, the audio and/or navigation system can be connected to the receiver of the remotely controlled locking system, so that the information about the key used can be transferred to the audio and/or navigation system. The user-related system parameters are then selected and set in the manner already described above.

It is also possible to fall back on memory elements for other vehicle components in order to identify the user, however. As an example, top of the range vehicles, in particular, have seat memories storing the driver's seat setting for different users of the vehicle. If a particular seat setting is now selected from the seat memory, this information can also be used to select and set the driver-specific system parameters for the audio and/or navigation system at the same time. The system parameters for the audio and/or navigation system can then, in particular, also be stored in the seat memory.

An inventive method for setting user-related system parameters in an audio and/or navigation system in a motor vehicle is distinguished in that the user is identified, system parameters are read from a memory element on the basis of the user identified, and the audio and/or navigation system is set using the system parameters which have been read.

BRIEF DESCRIPTION OF THE DRAWINGS

The invention is explained in more detail below with the aid of illustrative embodiments and the drawing, in which.

DETAILED DESCRIPTION OF THE PREFERRED EMBODIMENT

Figure 1:
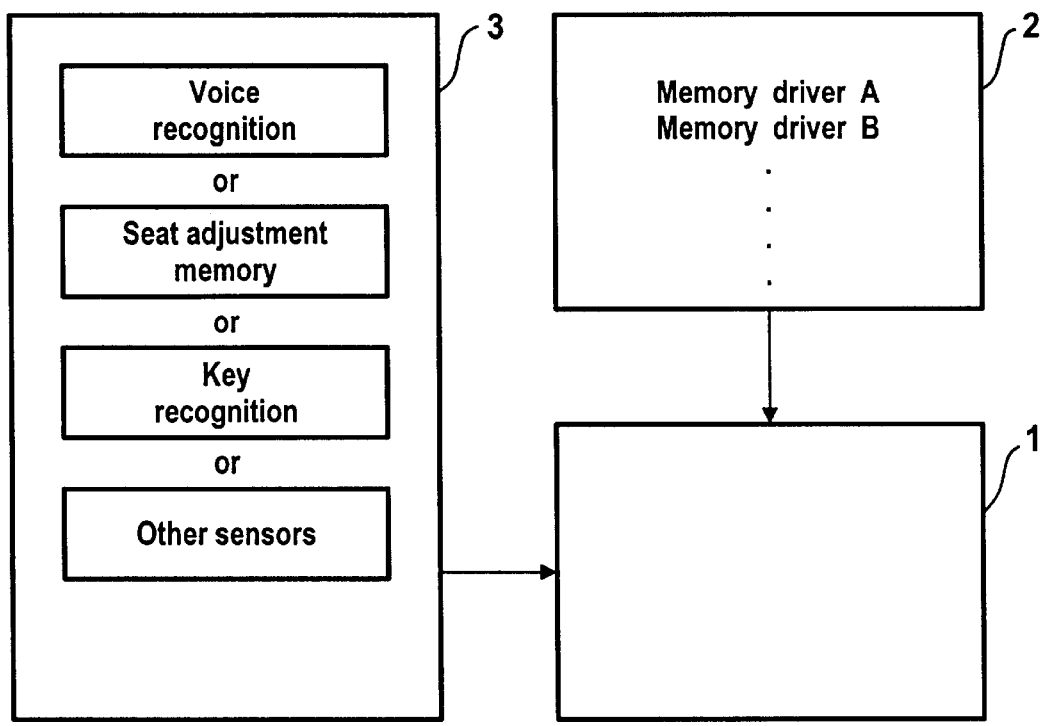
FIG. 1 shows a schematic illustration of a system according to the invention.

As FIG. 1 shows, the audio and/or navigation system 1 interact with a memory element 2 and with means 3 for identifying the user. The memory element 2 stores the preferred system parameters for various users A, B, C etc. The means 3 for identifying the user can be a voice recognition system, a key recognition system, a seat adjustment memory or other user-related sensors. If, as an example, the means 3 recognize that the vehicle key for user B has been used, this information is transmitted to the audio and/or navigation system. The audio and/or navigation system then retrieves and sets the user-related system parameters stored in the memory element 2 for user B. There is thus no need for the user to set the preferred system parameters manually.

Figure 2:
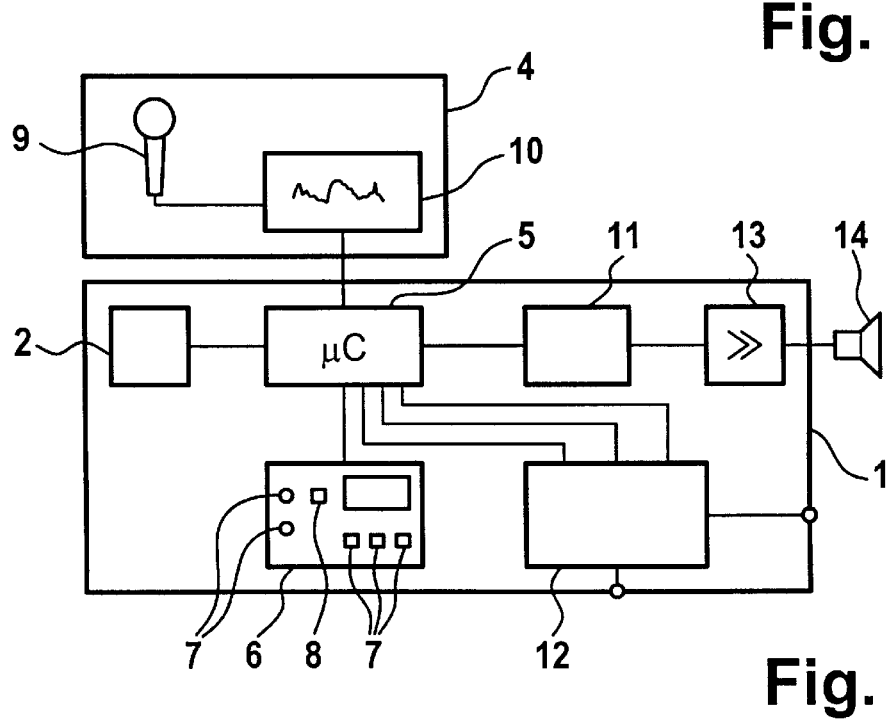
FIG. 2 shows an audio system according to the invention with user identification by means of voice recognition.

FIG. 2 shows an inventive audio system 1 which interacts with a voice recognition system 4. The audio system 1 contains a microprocessor 5 which is connected to a control unit 6. The control unit 6 contains various setting elements 7 for setting specific system parameters for the audio system. By way of example, these can be setting elements for the volume, the station, the tone, the reception of traffic news, the playing of a CD or musicassette and the like. The user uses the setting elements 7 to set his preferred system parameters and stores them by pressing the store button 8 in the memory element 2, which is likewise connected to the microcomputer 5. A user identification must then be additionally allocated to the stored data. For this, the user speaks a few words which are recorded by the microphone 9 in the voice recognition system 4 and are passed on to an evaluation unit 10 in the voice recognition system 4. The voice recognition system 4 assigns a user code to the recorded voice pattern and transfers this user code to the microcomputer 5 in the audio system 1. The user code can be allocated to the user-specific system parameters previously stored in the memory element 2 by pressing the store key 8 once again. The memory element 2 thus stores a data pair comprising a user code and user-specific system parameters. The process described need only be carried out a single time by each user. The voice recognition system mentioned is not the subject of this invention and therefore requires no more detailed explanation.

If the user uses the vehicle again, then he need first only identify himself by speaking one or a few words which are recorded by the microphone 9 and are evaluated by the evaluation unit 10. If the voice recognition system is able to associate the user with a stored code, the voice recognition system 4 passes on this code to the microprocessor 5. The microprocessor 5 now selects the user-specific system parameters stored for the user code in the memory element 2 and sets the audio system accordingly. For this, the microcomputer 5 transmits appropriate signals, for example, to actuators 11 for setting the volume, the balance or the tone. The microprocessor 5 can also output user-specific system parameters to other components 12 in the audio system, which are not illustrated in more detail, for example for setting a preferred radio station. The audio signal with the user-specific system settings is output to one or more loudspeakers 14 via an audio amplifier 13.

Figure 3:
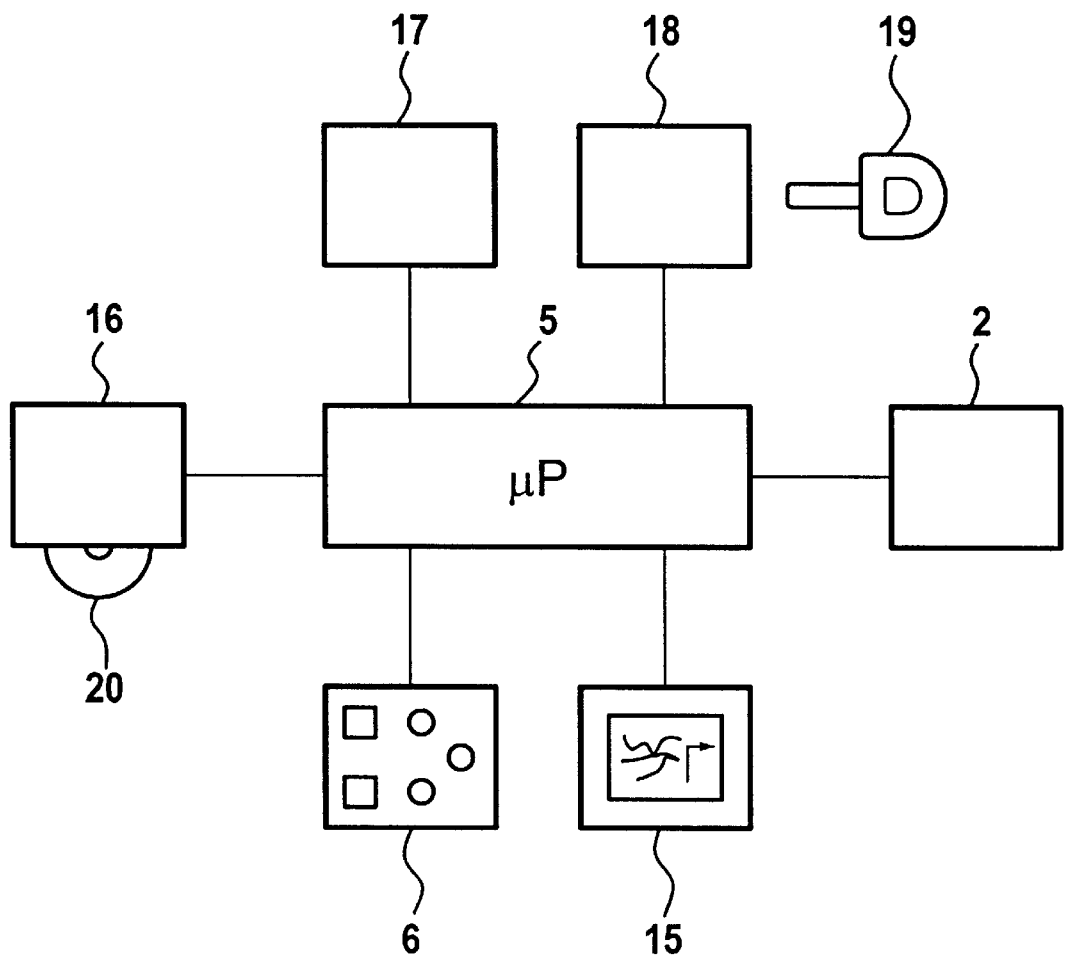
FIG. 3 shows a navigation system according to the invention.

FIG. 3 shows, as a further illustrative embodiment, a navigation system having the components which are essential to the invention. A control unit 6 connected to a microprocessor 5 can be used to set system parameters for the navigation system. As an example, the desired form of representation for the information on the display unit 15 can be selected. In addition, the destination can be input or selected from a list of possible destinations shown on the display unit 15. The control unit 6 and the display unit 15 can also be designed as a combined control/display unit. The navigation system also contains a reader unit 16 which can be used to read digitized map data stored on a CD-ROM 20 or a similar storage medium into the microprocessor 5. In addition, components 17 (not shown in more detail) for determining the position of the vehicle using compound navigation and/or GPS navigation are connected to the microprocessor 5. When a destination has been input, the microprocessor 5 calculates the route to the destination on the basis of the present location of the vehicle, determined by the components 17, and the map data. The display unit 15 is used to output journey information regarding the route to the driver. The microprocessor 5 can be connected to an audio system (not shown), with the audio system transmitting to the navigation system current traffic information which is taken into account for the route planning. In this regard, this is a known navigation system.

According to the invention, the microprocessor 5 is connected to a memory element 2 storing user-related system settings such as the desired information representation or an address book containing preferred destinations, and an associated user code. To associate the user-related system information with a user of the vehicle, the microprocessor is also connected to a vehicle locking system 18 which transmits a user code to the microprocessor 5 on the basis of the vehicle key 19 used. The code received is used to read the user-specific system parameters associated with this code from the memory element 2 and to set them.

Again, these user-related system settings need be stored only once by each user. The system settings can be stored as in the audio system described above, in which case, for user association, the code transmitted by the locking system is now stored together with the system settings.

For cost reasons, in particular, the means for identifying the user will generally not operate exclusively together with an audio and/or navigation system. In fact, a voice recognition system will be present in the vehicle essentially for reasons of driver authorization control, in particular. However, it can then also be used for setting the user-specific system parameters for the audio and/or navigation system. Hence, for the reasons stated, it is particularly preferable for the audio and/or navigation system to interact with a seat memory, which is already present anyway in some vehicles.

What is claimed is:

1. An audio and/or navigation system in a motor vehicle having a control unit for a user to set system parameters, wherein
   the audio and/or navigation system interacts with a memory element for storing user-related system parameters and with
   means for identifying the user, and
   contains further means, which are connected to the memory element and to the means for identifying the user, for selecting and setting the stored user-related system parameters for the user as current parameters for the audio and/or navigation system.

2. The audio and/or navigation system as claimed in claim 1, wherein the memory element is a component part of the audio and/or navigation system.

3. The audio and/or navigation system as claimed in claim 1, wherein the memory element is an external component of the system.

4. The audio and/or navigation system as claimed in claim 1, wherein the means for identifying the user are based on voice recognition.

5. The audio and/or navigation system as claimed in claims 1, wherein the means for identifying the user identify the user by means for the vehicle key used.

6. The audio and/or navigation system as claimed in claim 1, wherein the means for identifying the user fall back on memory elements having user-related data for vehicle components having a user-specific component setting value.

7. The audio and/or navigation system as claimed in claim 6, wherein a memory element for driver's seat setting values is involved.

8. A method for setting user-related system parameters in an audio and/or navigation system in a motor vehicle, wherein the user is identified; system parameters are read from a memory element on the basis of the user identified; the audio and/or navigation system is set using the system parameters which have been read.

9. The method as claimed in claim 8, wherein the user is identified on the basis of voice recognition.

10. The method as claimed in claim 8, wherein the user is identified by means of the vehicle key used.

11. The method as claimed in claim 8, wherein the user is identified by detecting the selected setting values for a vehicle component having a user-specific component setting value.

12. The method as claimed in claim 11, wherein the setting values are for the driver's seat.

\* \* \* \* \*